United States Patent

Lindsey

(10) Patent No.: US 7,978,446 B2
(45) Date of Patent: Jul. 12, 2011

(54) HIGH VOLTAGE GROUND FAULT DETECTION SYSTEM

(75) Inventor: Robert W. Lindsey, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 588 days.

(21) Appl. No.: 12/081,372

(22) Filed: Apr. 15, 2008

(65) Prior Publication Data

US 2009/0219656 A1     Sep. 3, 2009

Related U.S. Application Data

(60) Provisional application No. 61/064,360, filed on Feb. 29, 2008.

(51) Int. Cl.
    *H02H 3/16*    (2006.01)
    *H02H 9/08*    (2006.01)
(52) U.S. Cl. ............................... 361/42; 361/45; 361/49
(58) Field of Classification Search .................... 361/42, 361/45, 49
    See application file for complete search history.

(56) References Cited

U.S. PATENT DOCUMENTS

| | | | |
|---|---|---|---|
| 3,569,826 A | 3/1971 | Burnett | |
| 3,968,409 A * | 7/1976 | Windler | 361/109 |
| 4,188,574 A | 2/1980 | Allington | |
| 4,719,361 A * | 1/1988 | Brubaker | 290/45 |
| 4,809,123 A | 2/1989 | Allington et al. | |
| 4,878,142 A | 10/1989 | Bergman et al. | |
| 5,553,070 A * | 9/1996 | Riley | 710/61 |
| 5,835,322 A * | 11/1998 | Smith et al. | 361/45 |
| 5,945,802 A * | 8/1999 | Konrad et al. | 318/807 |
| 6,291,944 B1 * | 9/2001 | Hesterman et al. | 315/224 |
| 6,535,028 B1 | 3/2003 | Baker | |
| 6,794,879 B2 | 9/2004 | Lawson et al. | |
| 6,844,736 B2 | 1/2005 | Weems | |
| 6,856,137 B2 * | 2/2005 | Roden et al. | 324/509 |
| 6,856,283 B2 * | 2/2005 | Jacobson et al. | 342/368 |
| 7,102,355 B1 | 9/2006 | Kumar | |
| 7,113,065 B2 * | 9/2006 | Skibinski | 336/90 |
| 7,253,634 B1 | 8/2007 | Kasztenny et al. | |
| 7,292,042 B2 | 11/2007 | Morita et al. | |
| 7,459,914 B2 | 12/2008 | Lindsey et al. | |
| 7,626,396 B2 | 12/2009 | Lindsey et al. | |
| 7,714,587 B2 | 5/2010 | Lindsey et al. | |
| 2003/0155928 A1 | 8/2003 | Roden et al. | |
| 2006/0176060 A1 | 8/2006 | Pancke et al. | |
| 2008/0036466 A1 | 2/2008 | Raber | |

* cited by examiner

*Primary Examiner* — Stephen W Jackson
*Assistant Examiner* — Zeev Kitov
(74) *Attorney, Agent, or Firm* — Finnegan, Henderson, Farabow, Garrett & Dunner LLP

(57) ABSTRACT

A ground fault detection system for an electrical system is disclosed. The electrical system may have a first and a second electrical component and a controller, and the second electrical component may be coupled to the controller. The ground fault detection system may include a ground fault detection module integrated in the first electrical component. The first electrical component may be isolated from the second electrical component. The ground fault detection system may further include a data link configured to establish a data communication between a controller and the ground fault detection module. The ground fault detection module may be configured to activate a mode of operation for the first electrical component if a ground fault associated with the first electrical component is identified.

19 Claims, 3 Drawing Sheets

HIGH VOLTAGE GROUND FAULT DETECTION SYSTEM

PRIORITY STATEMENT

This application claims the benefit of prior provisional patent application Ser. No. 61/064,360 filed Feb. 29, 2008.

TECHNICAL FIELD

This disclosure relates generally to a ground fault detection system, and more particularly, to a high voltage ground fault detection system.

BACKGROUND

Electric or hybrid machines are widely used as alternatives to their mechanical counterparts in industrial applications due to their higher efficiency and lower maintenance requirements. A high voltage power system is required for driving an electric machine that incorporates a high voltage (HV) electrical drive motor and electric auxiliaries. High voltage, used herein and which may also be referred to as hazardous voltage, is a practical voltage potential used for electric drive machines. This generally includes ac and dc voltages greater than 50 volts. The integrity of the high voltage power system is critical to the reliability of the machine. Typically, the machine frame will be electrically isolated from the terminals or conductors of the high voltage electrical components in the high voltage power system.

Under normal conditions, leakage currents on the order of microamps exist between the conductors of the high voltage electrical components and the machine frame, and accordingly, the leakage resistances between the conductors of the high voltage electrical components and the frame are normally very high. Under such conditions, no ground fault exists in the high voltage power system. However, electric current from a high voltage electrical component may leak to a machine frame and cause a ground fault. Such leakage currents, when significant, may be an indication of machine component fatigue or failure of a conductor's insulation. In order to ensure the proper operating conditions of the machine, it is necessary to detect ground faults such as an electrical leakage between the conductors of the high voltage electrical components and the machine frame.

At least one system and method has been implemented to detect ground fault. For example, U.S. Pat. No. 7,292,042 to Morita et al. ("the '042 patent") discloses a ground fault detector and detection method for a vehicle. The ground fault detector described in the '042 patent is configured to detect ground faults on a plurality of electrical equipment units that are connected to the high-voltage battery. In the ground fault detector, one side of a coupling capacitor is connected to the plus terminal of a DC power source, and the other side of the coupling capacitor is connected to a central controller that applies a square-wave signal to the capacitor and detects a corresponding voltage. The ground fault detector of the '042 patent may determine the cause of the occurrence of a ground fault after detecting the presence of the ground fault.

Although the ground fault detector described in the '042 patent may be effective to some extent for detecting ground fault, it does not address detecting ground faults associated with isolated electrical components in the high voltage power system because these components may not be connected to a system-level ground fault detector. For example, an electric or hybrid electric machine may include high voltage motor controllers, power converters, or a distributed high voltage electrical system. These devices or systems may include galvanically isolated components such as, for example, power supplies or transformers. Therefore, a system-level ground fault detection system, such as the one described in the '042 patent may be incapable of detecting ground faults associated with the isolated components and/or isolated parts of a wiring system.

Furthermore, the ground fault detector described in the '042 patent may not function properly when the data communication between the electrical equipment units and the central controller fails. For example, the wiring systems and electrical components may be part of a machine control network where ground fault information is communicated to alert an operator or other systems. Therefore, in the event of a ground fault and a data communication failure (also known as a double failure condition), the operator of the ground fault detector described in the '042 patent may not be notified of the fault. As a result, damage to the high voltage power system may occur and the machine may be rendered inoperative.

The disclosed system and method for testing power transistors is directed towards overcoming one or more of the shortcomings set forth above.

SUMMARY

In one aspect, ground fault detection system for an electrical system is disclosed. The electrical system may have a first and a second electrical component and a controller, and the second electrical component may be coupled to the controller. The ground fault detection system may include a ground fault detection module integrated in the first electrical component. The first electrical component may be isolated from the second electrical component. The ground fault detection system may further include a data link configured to establish a data communication between a controller and the ground fault detection module. The ground fault detection module may be configured to activate a mode of operation for the first electrical component if a ground fault associated with the first electrical component is identified.

In another aspect, a method for detecting a ground fault associated with a first electrical component in an electrical system is disclosed. The first electrical component may be isolated from a second electrical component in the electrical system. The method may include locally determining a ground fault parameter based on ground fault measurements associated with the first electrical component, and locally identifying a ground fault status associated with the first electrical component if the ground fault parameter exceeds a threshold. The method may further include locally activating a mode of operation for the first electrical component, if the ground fault status is identified.

DETAILED DESCRIPTION

Figure 1:
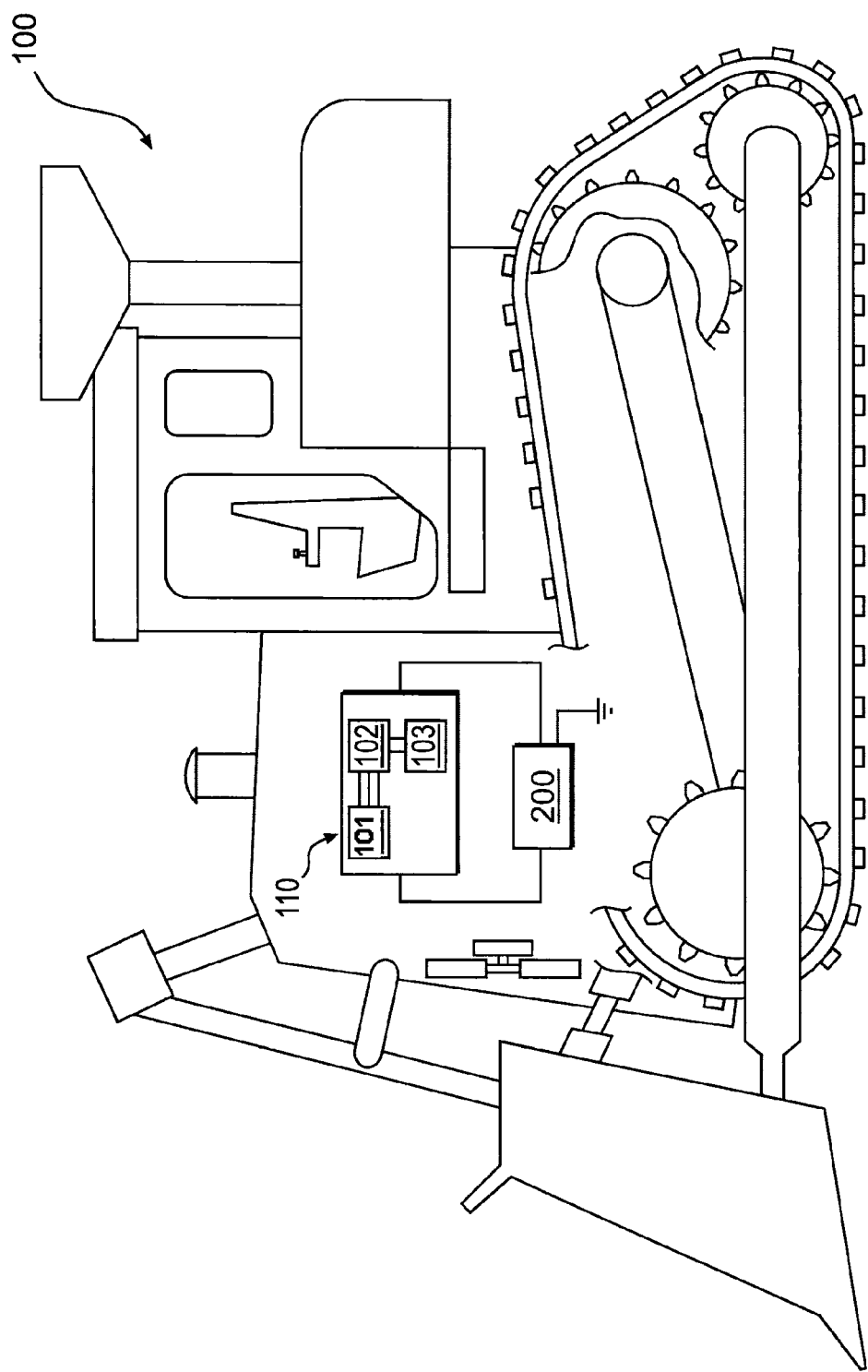
FIG. 1 illustrates a machine according to an exemplary embodiment consistent with the present disclosure.

Reference will now be made in detail to the disclosed embodiments, examples of which are illustrated in the accompanying drawings. Wherever possible, the same reference numerals will be used in the drawings to refer to the same or like parts.

FIG. 1 illustrates an exemplary disclosed machine 100 consistent with certain disclosed embodiments. Machine 100 may include, among other things, a high voltage power system 110, and a ground fault detection system 200. Machine, as the term is used herein, refers to a fixed or mobile machine that may perform some type of operation associated with a particular industry, such as mining, construction, farming, etc. and operate between or within work environments (e.g., a construction site, mine site, power plant, etc.). A non-limiting example of a fixed machine includes an engine system operating in a plant or off-shore environment (e.g., off-shore drilling platform). Non-limiting examples of mobile machines include commercial machines, such as trucks, cranes, earth moving vehicles, mining vehicles, backhoes, material handling equipment, farming equipment, marine vessels, on-highway vehicles, or any other type of movable machine that operates in a work environment.

High voltage power system 110 may include various electrical components, devices, and wirings configured to generate, transfer, convert or consume high voltage electric power. High voltage, as the term is used herein, refers to a voltage that is higher than 50 volts. High voltage power system 110 may include a power source 101 configured to provide electric power for use by one or more systems of machine 100. Power source 101 may be a generator driven by an engine, such as a combustion engine. Alternatively, power source 101 may be any other suitable device for providing a power output such as, for example, a battery, a fuel cell, or any other type of power source configured to provide electrical power to machine 100.

High voltage power system 110 may further include a power electronics system 102. Power electronics system 102 may be electrically coupled to power source 101 via a first set of conductors, and to one or more electric loads via a second set of conductors. The power electronics system 102 may include one or more power converters configured to convert power provided by power source 101 into power forms appropriate for consumption by the electric loads. For example, power electronics system 102 may include a power rectifier to convert an AC voltage supplied by power source 101 to a DC voltage output, and may further include a power inverter to convert the DC voltage to an AC voltage of a certain waveform. Power electronics system 102 may also include one or more power transformers and/or DC-DC converters configured to convert a voltage from a first level to a second level.

High voltage power system 110 may also include one or more electric loads 103. The electric loads may include an electric motor, such as, for example, an AC induction motor, a brushless DC motor, a variable or switched reluctance motor, a stepper motor, a linear motor, or any other type of motor. The electric motor may be coupled to power electronics system 102 and may be configured to convert at least a portion of the electric power output to mechanical energy for performing a task associated with machine 100. The electric motor may include a motor controller configured to provide electronic commutation to the electric motor. The electric loads may also include any other devices on a high-voltage system such as an electronic battery charger.

According to an embodiment of the present disclosure, one or more electrical components in power electronics system 102 and/or electric loads may be galvanically isolated from other parts of high voltage power system 110. For example, a power converter (e.g., a DC-DC power converter) may provide galvanic isolation between conductors or components. For another example, a motor controller may also include transformers or other components that galvanically isolate the electric motor, motor controller, and associated wirings from other parts of high voltage power system 110. Conventional ground fault detection systems may not be able to protect these galvanically isolated components.

For the purpose of detecting ground faults in isolated electrical components and offering local protection functions in the event of data communication failure, a ground fault detection system 200 may be included. Ground fault detection system 200 may be included as an integral part of the power electronics system 102 or a control system of machine 100. Alternatively, ground fault detection system 200 may be external to these systems, for example, as part of a separate electronic control module (ECM) associated with machine 100.

Ground fault detection system 200 may be electrically coupled to high voltage power system 110 and configured to detect a ground fault associated with one or more electrical components in high voltage power system 110. For example, ground fault detection system 120 may be electrically connected to one or more energizing terminals of an electrical component to perform a ground fault measurement and determine a ground fault parameter, such as a leakage current. Ground fault detection system 200 may further determine a ground fault status if the parameter exceeds a threshold. Ground fault detection system 200 may also provide an audible and/or visual warning signal indicative of the ground fault condition. Ground fault detection system 200 may further activate a mode of operation to protect the electrical component and the entire high voltage power system 110. The mode of operation may be selected according to the threshold level that the parameter exceeds.

Ground fault detection system 200 may continuously and/or periodically monitor the ground fault parameter associated with the electrical components and wirings of high voltage power system 110. Accordingly, ground fault detection system 200 may provide one or more continuous warning signals until the ground fault condition has subsided.

According to one embodiment, a user of ground fault detection system 200 may modify the threshold value and/or the sensitivity of ground fault detection system 200. For example, one or more circuit elements of ground fault detection system 200 may be modified or replaced to adjust the sensitivity of the detection system (e.g., from a sensitivity of +/−1 mA to a sensitivity of +/−0.1 mA). Alternatively and/or additionally, a user may modify the threshold value associated with ground fault detection system 200. Thus, ground fault detection system 200 may be scaled to operate in systems with various current levels and sensitivity requirements.

Figure 2A:
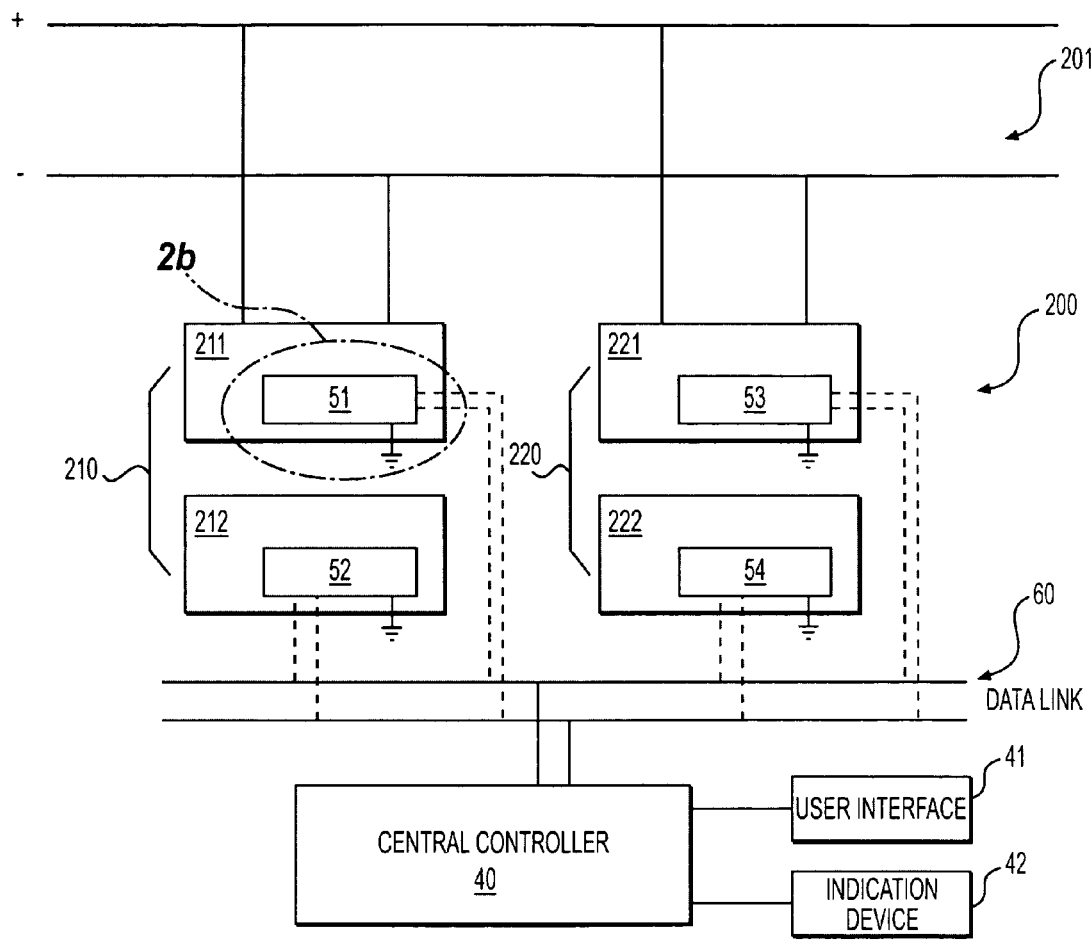
FIG. 2a provides a block diagram of a ground fault detection system according to an exemplary embodiment consistent with the present disclosure.

FIG. 2a provides a block diagram of ground fault detection system 200 according to an exemplary embodiment consistent with the present disclosure. Ground fault detection system 200 may include, among other things, a central controller 40, a user interface 41, an indication device 42, a data link 60, and a plurality of ground fault detection modules 51-54, integrated in a plurality of electrical components 211, 212, 221, and 222 in high voltage power system 110.

Electrical components 211 and 212 may be parts of an electrical device or circuit, such as a DC-DC power converter 210. Electrical component 212 may be isolated, e.g., galvanically isolated, from electrical component 211 and other parts of high voltage power system 110. Electrical components 211 and 212 may be two different electrical subsystems, each with a different voltage level. For example, electrical component 211 may have a voltage level of 500 volts and electrical component 212 may have a voltage level of 250 volts. Similarly, electrical components 221 and 222 may also be parts of an electrical device or circuit, such as a power transformer 220 in a motor controller. DC-DC power converter 210 and power transformer 220 may be coupled to a high voltage DC bus 201.

Figure 2B:
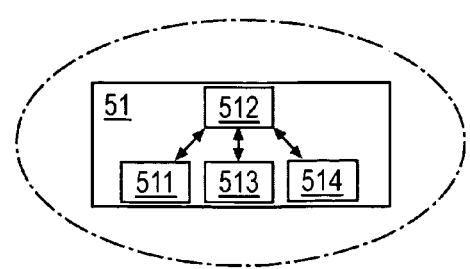
FIG. 2b provides a block diagram of a ground fault detection module according to an exemplary embodiment consistent with the present disclosure.

FIG. 2b provides a block diagram of a ground fault detection module according to an exemplary embodiment consistent with the present disclosure. As shown in FIG. 2b, each ground fault detection module, such as ground fault detection module 51, may include an electrical leakage detection circuit 511, a controller 512, an operation control unit 513, and an integrated indication device 514. Electrical leakage detection circuit 511 may be used to detect the presence of an electrical leakage current between a terminal of an electrical component (e.g., electrical component 211) and the frame of machine 100. In one embodiment, a "frame" may refer to the conductive housing of the machine containing the electrical component.

Controller 512 may include one or more devices that take voltage and/or current measurements in a circuit. For example, a voltage measuring device may be configured to measure voltages in electrical leakage detection circuit 511. Controller 512 may also include a leakage calculator that performs calculations to determine circuit imbalance, leakage resistances, leakage currents, etc. The leakage calculator may be configured by hardware components such as gate arrays (e.g., FPGA, ASICS), or by software. Additionally, controller 512 may provide data to other systems for further processing. For example, ground fault detection modules 51-54 may each include data communication lines connecting them to data link 60.

Controller 512 may further include an operation control unit 513 configured to activate/modify a mode of operation of the electrical component if a ground fault is detected but the data communication via data link 60 has failed. For example, controller 512 may operate to disconnect electrical component 211 from high voltage DC bus 201.

The ground fault detection module may further include an integrated indication device 514 to provide warning when a ground fault is detected. Integrated indication device 514 may include any component configured to provide a warning signal to an operator of machine 100, such as, for instance, a visual device, an audible device, and a wireless device.

According to one embodiment of the present disclosure, as shown in FIG. 2a, a central controller 40 may be included in ground fault detection system 200 to perform centralized ground fault detection, analysis, and indication. Central controller 40 may be configured to communicate with ground fault detection modules 51-54. The data communication between central controller 40 and ground fault detection modules 51-54 may be established by data link 60. Data link 60 may include a communication cable, a wireless network, or any other suitable communication medium, being configured to transfer data, and send or receive instructions between central controller 40 and ground fault detection modules 51-54.

Central controller 40 may include, among other things, a processing unit, a storage unit, and an I/O interface. The processing unit may include any appropriate type of general purpose microprocessor, digital signal processor, or microcontroller. The storage unit may include any appropriate type of mass storage provided to store any type of information that the processing unit may need to operate. For example, the storage unit may include a ROM, a flash memory, a dynamic RAM, a static RAM, a hard disk, an optical disk, or other storage devices to provide storage space. The I/O interface may be configured to obtain data from and/or to transmit data to data link 60.

Central controller 40 may be configured to receive ground fault measurements from ground fault detection modules 51-54 via data link 60 and store the measurement data in the storage unit. Central controller 40 may be further configured to analyze the received measurements and identify ground faults associated with any of electrical components 211, 212, 221 and 222. Alternatively, central controller 40 may be configured to receive ground fault statuses from ground fault detection modules 51-54 through data link 60 and via the I/O interface and store the status data in the storage unit. If a ground fault is detected, central controller 40 may provide a warning to an operator of machine 100.

User interface 41 may be a computer, an operator console, or a handheld operator panel. User interface 41 may be coupled to central controller 40 via communication cables, wireless networks, or other communication media. User interface 41 may include a graphic interface for user input. User interface 41 may include a keyboard, a switch, a mouse, and/or a touch screen. User interface 41 may be configured to receive data input from users, and send the data input to central controller 40 via the I/O interface. A user may modify the sensitivity and threshold value associated with ground fault detection system 200 via user interface 41.

Indication device 42 may be an integral part of user interface 41 or a separate device. Indication device 42 may be coupled to central controller 40 via communication cables, wireless networks, or other communication media. Indication device 42 may include any component configured to provide a warning signal to a user associated with machine 100 such as, for instance, a visual device (e.g., warning lamp, LCD display, LED lamp, etc.); an audible device (e.g., speaker, bell, chime, etc.); a wireless device (e.g., cell phone, pager, etc.); or any other type of output device. In one embodiment, an LED lamp may be coupled with an audible alarm to provide a combination audio/visual warning.

INDUSTRIAL APPLICABILITY

Although the disclosed embodiments are described in association with a ground fault detection system for a high voltage power system 110 of machine 100, the disclosed ground fault detection system may be used in any environment where it may be desirable to detect a ground fault on an electrical component, such as on an isolated electrical component, and offer local protection functions in the event of data communication failure.

Specifically, the disclosed ground fault detection system may perform ground fault measurements associated with an electrical component using a ground fault detection module integrated in the electrical component. The ground fault detection module may be configured to determine a ground fault parameter associated with the electrical component based on the measurements. The ground fault detection module may further be configured to identify a ground fault status and activate a mode of operation for the electrical component, if the ground fault parameter exceeds a threshold. The ground fault detection module may also be configured to report the ground fault status to a central controller via a data link, if the data communication is established. The ground fault detection module may independently activate a mode of operation for the electrical component if the data communication is not established.

Moreover, if the data communication is established, the central controller of the disclosed ground fault detection system may receive ground fault measurements associated with the electrical component via the data link, identify a ground fault status associated with the electrical component based on the received ground fault measurements, and send the ground fault status associated with the electrical component to the data link. Accordingly, the ground fault detection module may be further configured to receive a ground fault parameter/status associated with the electrical component from the data link, and activate a mode of operation for the electrical component based on the received ground fault parameter/status.

Figure 3:
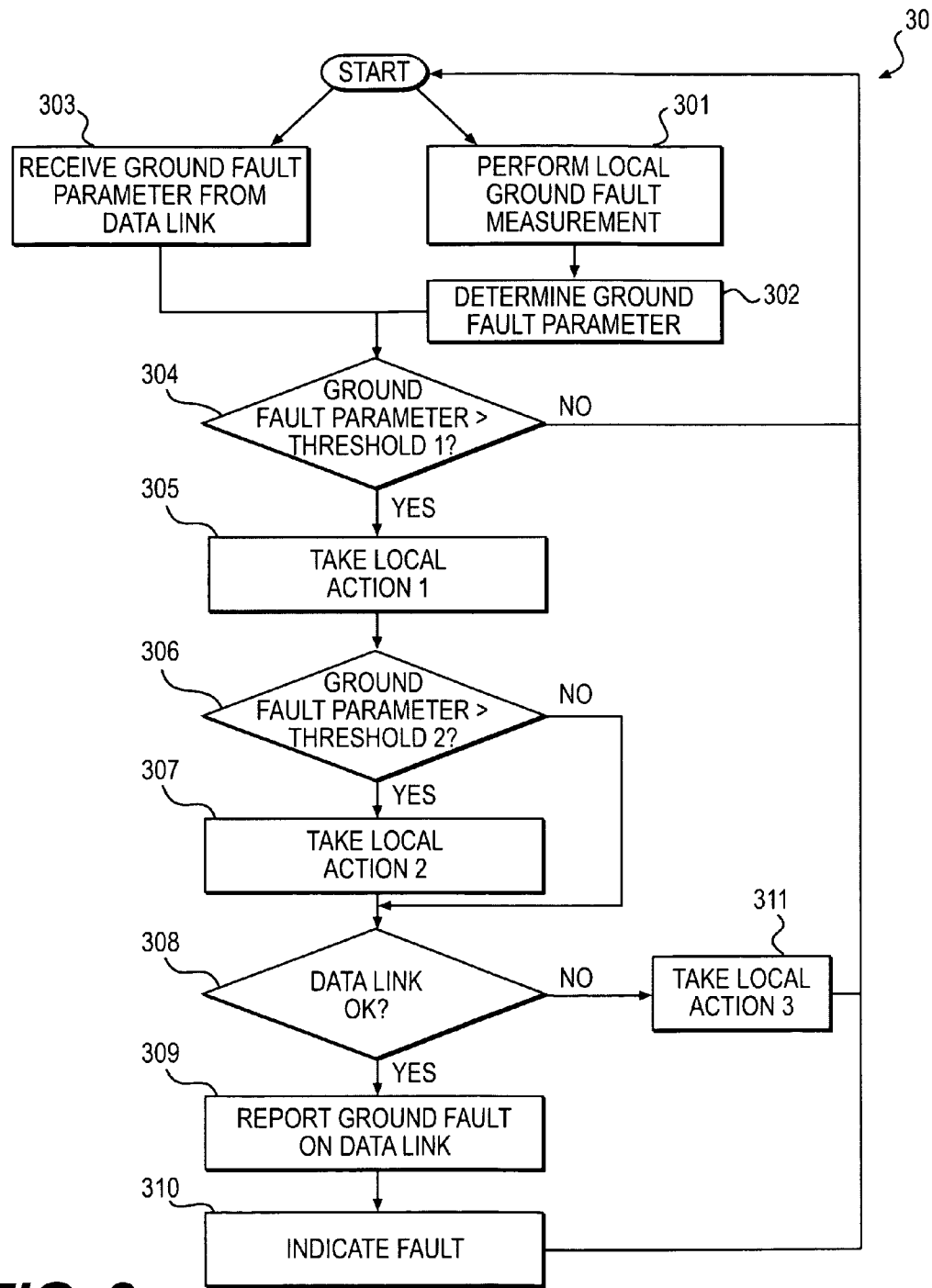
FIG. 3 provides a flowchart of an exemplary operation process of a ground fault detection system, consistent with the disclosed embodiment shown in FIG. 2.

FIG. 3 provides a flowchart of an exemplary operation process 30 of ground fault detection system 200, consistent with the disclosed embodiment shown in FIG. 2. As shown in FIG. 3, a ground fault detection module (e.g., ground fault detection module 51) integrated in an electrical component (e.g., electrical component 211) may perform local ground fault measurements associated with the electrical component (Step 301). For example, ground fault detection module 51 may include a voltage measuring device configured to measure voltages in electrical leakage detection circuit 511. In Step 302, ground fault detection module 51 may be further configured to determine a ground fault parameter based on the measurements obtained in Step 301. For example, ground fault detection module 51 may also include a leakage calculator configured to perform calculations to determine circuit imbalance, leakage resistances, leakage currents, etc.

Additionally or alternatively, the ground fault parameter may also be received from data link 60 (Step 303). For example, central controller 40 may receive ground fault measurements from ground fault detection modules 51-54 and perform analysis to determine the ground fault parameter, and send the ground fault parameter to data link 60. When the data communication between central controller 40 and ground fault detection modules 51-54 via data link 60 is not established, process 30 may skip Step 303 and proceed to Step 304. When the data communication is established, Step 303 may be included to enhance the reliability of ground fault detection system 200. For example, the ground fault parameter received from data link 60 and the ground fault parameter determined locally by ground fault detection module 51 may be compared for self-validation. If the parameters do not match, it may be an indication that at least one part of ground fault detection system 200 may contain a fault. Accordingly, a fault indication may be provided on indication device 42.

Ground fault detection module 51 may be further configured to determine whether the ground fault parameter exceeds a first threshold THRESHOLD 1 (Step 304). For example, the ground fault parameter may be a leakage current, and THRESHOLD 1 may be 5 mA. If the ground fault parameter exceeds THRESHOLD 1 (Step 304: Yes), ground fault detection module 51 may identify a first ground fault status and take a first local action (Step 305). The first action may include recording the ground fault status, provide a warning via integrated indication device 514, and/or activate a first mode of operation for electrical component 211. For example, ground fault detection module 51 may degrade the operation mode of DC-DC power converter 210. If the ground fault parameter is below THRESHOLD 1 (Step 304: No), no ground fault is detected and process 30 may return to its beginning to perform continuous ground fault detection.

Ground fault detection module 51 may be further configured to determine whether the ground fault parameter exceeds a second threshold THRESHOLD 2 (Step 306). THRESHOLD 2 may be a higher threshold value than THRESHOLD 1, and may correspond to a more severe ground fault condition. For example, the ground fault parameter may be a leakage current, and THRESHOLD 2 may be 50 mA. If the ground fault parameter exceeds THRESHOLD 2 (Step 306: Yes), ground fault detection module 51 may identify a second ground fault status and take a second local action (Step 307). The second action may also include recording the ground fault status, provide a warning via integrated indication device 514, and/or activate a second mode of operation for electrical component 211. For example, ground fault detection module 51 may disconnect DC-DC power converter 210 from high voltage DC bus 201. If the ground fault parameter is below THRESHOLD 2 (Step 306: No), process 30 may skip Step 307 and proceed to Step 308.

In Step 308, ground fault detection module 51 may determine whether the data communication via data link 60 is established. If the data communication is established (Step 308: Yes), ground fault detection module 51 may report the first ground fault status and second (if applicable) ground fault status to data link 60 (Step 309). Data link 60 may send the statuses to central controller 40 and central controller 40 may provide a warning to an operator of machine 100 on indication device 42 (Step 310).

If the data communication is not established (Step 308: No), ground fault detection module 51 may operate to activate a default mode of operation for electrical component 211 to protect the component (Step 311). For example, ground fault detection module 51 may turn off DC-DC power converter 210 and/or enable a backup system for DC-DC power converter 210. Additionally, ground fault detection module 51 may also record the data communication failure event and provide a warning via integrated indication device 514. After Step 311, process 30 may return to its beginning to perform continuous ground fault detection.

Ground fault detection system 200 in the present disclosure may provide broader ground fault protection compared to conventional systems, such as the one described in the '042 patent. For example, the disclosed ground fault detection system 200 may include ground fault detection modules 52 and 54 that are integrated in isolated electrical components 212 and 222 and configured to detect ground faults locally on these electrical components. Ground faults on galvanically isolated electrical components 212 and 222 may not be detected by conventional ground fault detection systems because these components may not be connected to a system-level ground fault detector such as the one described in the '042 patent.

Furthermore, the disclosed ground fault detection system 200 may provide a default mode of operation if a ground fault occurs on electrical component 211 and the data communication between the integrated ground fault detection module 51 and data link 60 is not established (i.e., a double failure). A default action for protecting high voltage power system 110 and its components may be taken, in absence of control instructions from central controller 40. Warnings of the double failure condition may also be provided by ground fault detection module 51. As a result, machine 100 may be protected from damages caused by a double failure condition.

In addition, the disclosed ground fault detection system 200 may provide increased reliability over conventional ground fault detection systems, such as the one described in the '042 patent. For example, the disclosed ground fault detection system 200 may include ground fault detection modules 51-54 that are integrated in the electrical components of high voltage power system 110, in addition to central controller 40 that may be configured to detect ground faults. Therefore, redundancy may be provided in ground fault detection since multiple detection modules may be available to detect a ground fault. Accordingly, the disclosed ground fault detection system 200 may offer a self-validation function by comparing detection results generated by the multiple detection modules.

It will be apparent to those skilled in the art that various modifications and variations can be made to the disclosed ground fault detection system without departing from the scope of the disclosure. Other embodiments will be apparent to those skilled in the art from consideration of the specification and practice of the disclosed embodiments. It is intended that the specification and examples be considered as exemplary only, with a true scope of the present disclosure being indicated by the following claims.

What is claimed:

1. A ground fault detection system for an electrical system, the electrical system having a first electrical component and a second electrical component, the ground fault detection system comprising:
    a first ground fault detection module configured to detect a ground fault of the first electrical component, and to activate a mode of operation for the first electrical component when a ground fault of the first electrical component is detected;
    a second ground fault detection module configured to detect a ground fault of the second electrical component, and to activate a mode of operation for the second electrical component when a ground fault of the second electrical component is detected,
    wherein the first electrical component is isolated from the second electrical component; and
    a ground fault controller configured to provide a warning in response to receiving, over a data link between the controller and the first and second ground fault detection modules, a report of a detected ground fault of the first electrical component from the first ground fault detection module or a report of a detected ground fault of the second electrical component from the second ground fault detection module.

2. The system of claim 1, wherein the first and second ground fault detection modules are further configured to:
    determine whether the data link is established;
    report a detected ground fault of the first electrical component and a detected ground fault of the second electrical component, respectively, to the controller over the data link, when the data link is established; and
    activate a protection mode of operation for the first electrical component and a protection mode of operation for the second electrical component, when the data communication is not established.

3. The system of claim 1, wherein the first and second ground fault detection modules are further configured to:
    perform ground fault measurements associated with the first electrical component and the second electrical component;
    determine a ground fault parameter based on the ground fault measurements; and
    identify ground fault statuses associated with the first electrical component and the second electrical component, respectively, when the ground fault parameter exceeds a threshold.

4. The system of claim 1, wherein the first and second ground fault detection modules respectively include first and second integrated indication devices configured to provide a warning when a ground fault associated with the first electrical component is detected and when a ground fault associated with the second electrical component is detected.

5. The system of claim 1, wherein the controller is further configured to:
    receive ground fault measurements associated with the first electrical component and the second electrical component via the data link;
    identify ground fault statuses associated with the first electrical component and the second electrical component based on the received ground fault measurements; and
    send the ground fault statuses of the first electrical component and the second electrical component to the first and second ground fault detection modules, respectively, over the data link.

6. The system of claim 5, wherein the first and second ground fault detection modules are further configured to:
    receive the ground fault statuses associated with the first electrical component and the second electrical component over the data link; and
    activate modes of operation for the first electrical component and the second electrical component based on the received ground fault statuses.

7. The system of claim 3, wherein the threshold includes a plurality of threshold values, and the ground fault statuses have a plurality of status levels, each status level corresponding to one of the plurality of values, and wherein the modes of operation for the first and second electrical components are determined according to the status levels.

8. The system of claim 1, wherein the isolation between the first electrical component and the second electrical component is a galvanic isolation.

9. The system of claim 1, wherein the first electrical component and the second electrical component include a motor controller, a power converter, or a power transformer.

10. The system of claim 3, wherein the ground fault parameter is a leakage current, a leakage resistance, or a leakage voltage.

11. A method for detecting a ground fault associated with a first electrical component and a second electrical component in an electrical system, wherein the first electrical component is isolated from the second electrical component in the electrical system, comprising:
    using a first ground fault detection module associated with the first electrical component:
        locally determining a first ground fault parameter based on ground fault measurements associated with the first electrical component;
        locally identifying a first ground fault status associated with the first electrical component if the first ground fault parameter exceeds a threshold; and
        locally activating a mode of operation for the first electrical component, if the first ground fault status is identified;
    using a second ground fault detection module associated with the second electrical component:
        locally determining a second ground fault parameter based on ground fault measurements associated with the second electrical component; and
        locally identifying a second ground fault status associated with the second electrical component if the second ground fault parameter exceeds a threshold; and
        locally activating a mode of operation for the second electrical component, if the second ground fault status is identified; and
    providing, by a ground fault controller, a warning in response to receiving a report of the first ground fault status from the first ground fault detection module or a report of the second ground fault status from the second ground fault detection module, respectively, over a data link.

12. The method of claim 11, further including;
determining whether the data link is established; and
reporting the detected first ground fault status and the detected second ground fault status to the controller over the data link, when the data link is established; and
locally activating a protection mode of operation for the first electrical component and a protection mode of operation for the second electrical component when the data link is not established.

13. The method of claim 11, further including:
receiving a report of a ground fault status associated with the first electrical component and report of a ground fault status associated with the second electrical component over the data link; and
locally activating a mode of operation for the first electrical component and a mode of operation for the second electrical component based on the received indications of the ground fault statuses.

14. The method of claim 11, wherein:
the threshold includes a first threshold value and a second threshold value;
a first mode of operation is activated for the first electrical component and for the second electrical component, when the first ground fault parameter exceeds the first threshold value and when the second ground fault parameter exceeds the first threshold value, respectively; and
a second mode of operation is activated for the first electrical component and for the second electrical component, when the first ground fault parameter exceeds the second threshold value and the second ground fault parameter exceeds the second threshold value, respectively.

15. The method of claim 14, wherein the first mode of operation includes degrading an operation mode of the first electrical component or of the second electrical component.

16. The method of claim 14, wherein the second mode of operation includes disconnecting the first electrical component or disconnecting the second electrical component.

17. The method of claim 11, further including recording a data communication failure event and providing a warning when the data link is not established.

18. A machine, comprising:
a high voltage power system having a first electrical component, a second electrical component and a controller, wherein the first electrical component is isolated from the second electrical component; and
a ground fault detection system electrically coupled to the high voltage power system, wherein the ground fault detection system includes:
a first ground fault detection module configured to:
detect a ground fault of the first electrical component;
determine whether a data link to the controller is established;
when the data link is established, report the detected ground fault of the first electrical component to the controller over the data link; and
when the data link is not established, activate a mode of operation for the first electrical component;
a second ground fault detection module configured to:
detect a ground fault of the second electrical component;
determine whether the data link to the controller is established;
when the data link is established, report the detected ground fault of the second electrical component to the controller over the data link; and
when the data link is not established, activate a mode of operation for the second electrical component; and
a ground fault controller configured to provide a warning in response to receiving, over the data link, a report of the detected ground fault of the first electrical component or a report of the detected ground fault of the second electrical component.

19. The machine of claim 18, wherein the isolation between the first electrical component and the second electrical component is a galvanic isolation, and wherein the first electrical component and the second electrical component include a motor controller, a power converter, or a power transformer.

* * * * *